United States Patent
Cheung et al.

(10) Patent No.: US 10,173,188 B2
(45) Date of Patent: Jan. 8, 2019

(54) HAND-HELD BLENDER

(71) Applicant: Huiyang Allan Plastic & Electric Industries Co., Limited, Huizhou (CN)

(72) Inventors: Shu Sang Cheung, Huizhou (CN); To Yin Pang, Huizhou (CN)

(73) Assignee: Huiyang Allan Plastic & Electric Industries Co., Limited (CN)

( * ) Notice: Subject to any disclaimer, the term of this patent is extended or adjusted under 35 U.S.C. 154(b) by 329 days.

(21) Appl. No.: 15/042,352

(22) Filed: Feb. 12, 2016

(65) Prior Publication Data

US 2017/0065944 A1    Mar. 9, 2017

(30) Foreign Application Priority Data

Sep. 7, 2015 (CN) .......................... 2015 1 0561872

(51) Int. Cl.
*B01F 13/04* (2006.01)
*A47J 43/07* (2006.01)
(Continued)

(52) U.S. Cl.
CPC ......... *B01F 13/047* (2013.01); *A47J 43/0755* (2013.01); *A47J 43/082* (2013.01);
(Continued)

(58) Field of Classification Search
CPC .................................................. B01F 13/047
See application file for complete search history.

(56) References Cited

U.S. PATENT DOCUMENTS 5,368,384 A * 11/1994 Duncan ................. A47J 43/044
                                                                219/227
7,371,003 B2 * 5/2008 Hamelin ............. A47J 43/0711
                                                                138/96 R
(Continued)

FOREIGN PATENT DOCUMENTS

CN        103230230 B  *  4/2015
DE          29719596 U1 *  1/1998  .......... A47J 43/0755
(Continued)

OTHER PUBLICATIONS

Espacenet Translation of DE 29719596. Retrieved Aug. 2018. (Year: 1998).*

(Continued)

*Primary Examiner* — Abbas Rashid
(74) *Attorney, Agent, or Firm* — Lerner, David, Littenberg, Krumholz & Mentlik, LLP

(57) ABSTRACT

A hand-held blender includes a housing and a body. The body is disposed in the housing, and the body comprises a microprocessor, a pressure sensor, a pressure button, a driving device, a coupling, a stirring rod, a power switch and a safety protection device; the coupling is connected with the stirring rod and driving device, respectively; the microprocessor is connected with the driving device. The safety protection device includes a safety switch and a security processing chip; the security processing chip is connected with the safety switch and the microprocessor, respectively; the microprocessor unlocks or locks the whole circuit of the hand-held blender only after receiving the signal of unlocking or locking from the security processing chip; the pressure sensor is connected with the pressure button and the microprocessor, respectively; the microprocessor controls the voltage provided to the driving device in accordance with the pressure applied on the pressure button.

9 Claims, 6 Drawing Sheets

(51) Int. Cl.
*A47J 43/08* (2006.01)
*B01F 13/00* (2006.01)
*B01F 15/00* (2006.01)
*A47J 43/044* (2006.01)

(52) U.S. Cl.
CPC ...... *B01F 13/002* (2013.01); *B01F 15/00162* (2013.01); *A47J 2043/04427* (2013.01)

(56) References Cited

U.S. PATENT DOCUMENTS

| | | | | |
|---|---|---|---|---|
| 8,172,451 | B2 * | 5/2012 | Li | A47J 43/0705 366/129 |
| 9,603,490 | B2 * | 3/2017 | Cheung | A47J 43/082 |
| 9,717,369 | B2 * | 8/2017 | Cheung | A47J 43/044 |
| 9,808,779 | B2 * | 11/2017 | Cheung | B01F 13/002 |
| 2002/0018398 | A1 * | 2/2002 | Krall | A47J 43/082 366/129 |
| 2002/0051405 | A1 * | 5/2002 | Juriga | A47J 43/082 366/129 |
| 2007/0046111 | A1 * | 3/2007 | Lagier | H02K 9/06 310/58 |
| 2009/0303830 | A1 * | 12/2009 | Wilson | A47J 43/044 366/129 |
| 2015/0009776 | A1 * | 1/2015 | Cheung | A47J 43/082 366/129 |
| 2015/0375184 | A1 * | 12/2015 | Cheung | B01F 13/002 366/129 |
| 2016/0100716 | A1 * | 4/2016 | Cheung | A47J 43/044 366/129 |

FOREIGN PATENT DOCUMENTS

JP 2011055934 A * 3/2011
WO WO-2015078853 A1 * 6/2015 ............ A47J 43/082

OTHER PUBLICATIONS

Google Patents Translation of JP2011 055934. Retrieved Aug. 2018. (Year: 2011).*
Google Patents Translation of CN 103 230 230 B. Retrieved Aug. 2018. (Year: 2015).*
Espacenet. European Search Report and Written Opinion for EP 16 15 3158. (Year: 2017).*

* cited by examiner

HAND-HELD BLENDER

CROSS-REFERENCE TO RELATED APPLICATIONS

The present application claims priority from Chinese Patent Application No. 201510561872. X filed Sep. 7, 2015, the disclosure of which is hereby incorporated herein by reference.

TECHNICAL FIELD

The present invention relates to the technical field of blenders, in particular to a hand-held blender.

BACKGROUND

Some the hand-held blenders in the market allows the use to adjust the stirring speed of a hand-held blender firstly, and then turn the switch on to start stirring. When switching to another stirring speed is required, the switch of the blender is required to be turned off, the stirring speed of the blender is adjusted to another one, and the switch is restarted to stir. Other hand-held blenders allow speed adjustment during stirring. But during the process of stirring, users need to hold the hand-held blender tightly with one hand when adjusting the stirring speed, and adjust a speed-control knob to the corresponding setting with the other hand, thereby adjusting the stirring speed during the stirring process. Existing hand blenders start to stir immediately after the switch is turned on, and the size of a hand-held blender is generally small, users may easily touch the power switch accidentally. If a user turns on the power switch of the hand-held blender accidentally, the stirring rod of the hand-held blender will start to rotate, and may harm the user. Therefore, the existing hand-held blenders have problems with low operating safety, complex structures and complicated procedure of adjusting speed.

SUMMARY OF THE INVENTION

The purpose of the invention is to provide a hand-held blender with safe and high performance and easy operation.

A hand-held blender, including: a housing and a body. The body is disposed in the housing; the body comprises a microprocessor, a pressure sensor, a pressure button, a driving device, a coupling, a stirring rod, a power switch and a safety protection device; the coupling is connected with the stirring rod and the driving device, respectively, with the purpose of transmitting the driving force output by the driving device to the stirring rod; the microprocessor is connected with the driving device. The safety protection device includes a safety switch and a security processing chip; the security processing chip is connected with the safety switch and the microprocessor, respectively; the microprocessor locks or unlocks the whole circuit of the hand-held blender after receiving the signal of locking or unlocking from the security processing chip; the pressure sensor is connected with the pressure button and the microprocessor, respectively; the microprocessor controls the voltage provided to the driving device in accordance with the pressure exerted on the pressure button; the voltage is proportional to the pressure; the hand-held blender enters into the working state of stirring after the power switch is turned on and the whole circuit is unlocked.

Via setting a safety switch and a security processing chip in the hand-held blender, the whole circuit of the hand-held blender is still locked after the power switch is turned on, that is, the whole circuit is in the off state, and the hand-held blender is unable to work. After the power switch of the hand-held blender is turned on, the whole circuit of the hand-held blender is unlocked only when the signal of unlocking is received from the security processing chip, and at this time, the hand-held blender is able to start working. So even if a user presses the pressure button without care, the circuit of the hand-held blender cannot be switched on, and the hand-held blender would not enter into the stirring state. Therefore, the hand-held blender of the present invention is able to avoid the security risks brought to the users when users misuse to start the hand-held blender, and thus the hand-held blender of the present invention is a blender with high safety performance. Furthermore, users are able to control the voltage provided to the driving device simply via controlling the pressure exerted on the pressure button, and thus control the driving force provided to the stirring rod by the driving device, and control the stirring speed of the stirring rod. Therefore, users may adjust the stirring speed of the hand-held blender as required through the pressure button, and the procedure of adjusting speed is simple and convenient.

Further, the body includes a pressure display; the pressure display is connected with the pressure sensor and used to display the pressure detected by the pressure sensor. Users can obtain the pressure exerted by the pressure button from the pressure display, which helps users to adjust the pressure pressed on the pressure button. Preferably, the pressure display is disposed on top of the housing, which enables users to easily obtain the pressure information during the process of using the hand-held blender.

Further, the pressure display is provided with one or more signal lights. A plurality of signal lights are provided and used to display the pressure pressed on the pressure button, pressure is divided into several pressure grades from low to high in advance, the several pressure grades correspond to the pressure signal lights from less to more. For example, three pressure settings can be provided: when the pressure is in pressure setting 1, one pressure signal light shines; when the pressure is in the pressure setting 2, two pressure lights shine. That means, multiple speed signal lights may be disposed and used to display the running speed of the driving device. It is simple and convenient to provide users with signals such as pressure and running speed by making use of signal lights.

Further, the number of safety switches is at least two, only when the power switch is turned on and all the safety switches are pressed successively, the whole circuit of the hand-held blender is unlocked, and the whole circuit of the hand-held blender is switched on. Therefore, it can be avoided that a user presses a safety switch accidentally and starts the hand-held blender, and it may be further prevented that a user starts the hand-held blender due to misoperation and the safety of the hand-held blender can be ensured.

Further, the number of safety switches is at least two, after the whole circuit of the hand-held blender is unlocked, when all the safety switches are pressed successively again, the security processing chip sends a locking signal to the microprocessor. During the mixing process of the hand-held blender, the whole circuit of the hand-held blender is locked by pressing all the safety switches successively, thus, it can be prevented that the whole circuit of the hand-held blender is switched off due to the misoperation by the user.

Further, when the hand-held blender has stopped mixing for more than a preset time, the security processing chip sends a locking signal to the microprocessor, and the safety protection device locks the whole circuit. On the one hand, energy consumption is saved, and the purpose of environmental protection is achieved; on the other hand, users are prevented from making the hand-held blender enter into the mixing state accidentally and being hurt, therefore, this hand-held blender of the invention is environmental friendly and very safe.

Further, the safety switch is set on top of the housing. The size of the hand-held blender is small, with the safety switch set on top of the housing, users can operate the power switch quickly and conveniently, no matter if it is in the start-up phase or in the mixing phase of the hand-held blender.

Further, the safety switch is a touch switch. The safety switch being provided as a touch switch enables users to operate the safety switch more quickly and conveniently, achieving the purpose of operation by pressing the safety switch gently.

Further, the security processing chip is a data processing chip. The security processing chip generates a locking or unlocking signal according to user is operation on the safety switch, and transmits the corresponding signal to the microprocessor, as a result, users can lock or unlock the whole circuit of the hand-held blender through simply operating the safety switch, the procedure is simple, and it is easy to operate, and it is very safe.

The hand-held blender of the present invention has the following beneficial effects:

1) a safety protection device is provided, avoiding the misoperation by the users and hidden security risks to users, and improving the safety performance of the hand-held blender.

2) stepless speed regulation of the stirring speed is achieved via the pressure exerted on the pressure button by users, and it is simple and convenient to adjust the speed.

3) the user can turn on or off, unlock or lock the blender with single hand, and it is convenient to operate.

DETAILED DESCRIPTION OF THE INVENTION

Figure 1:
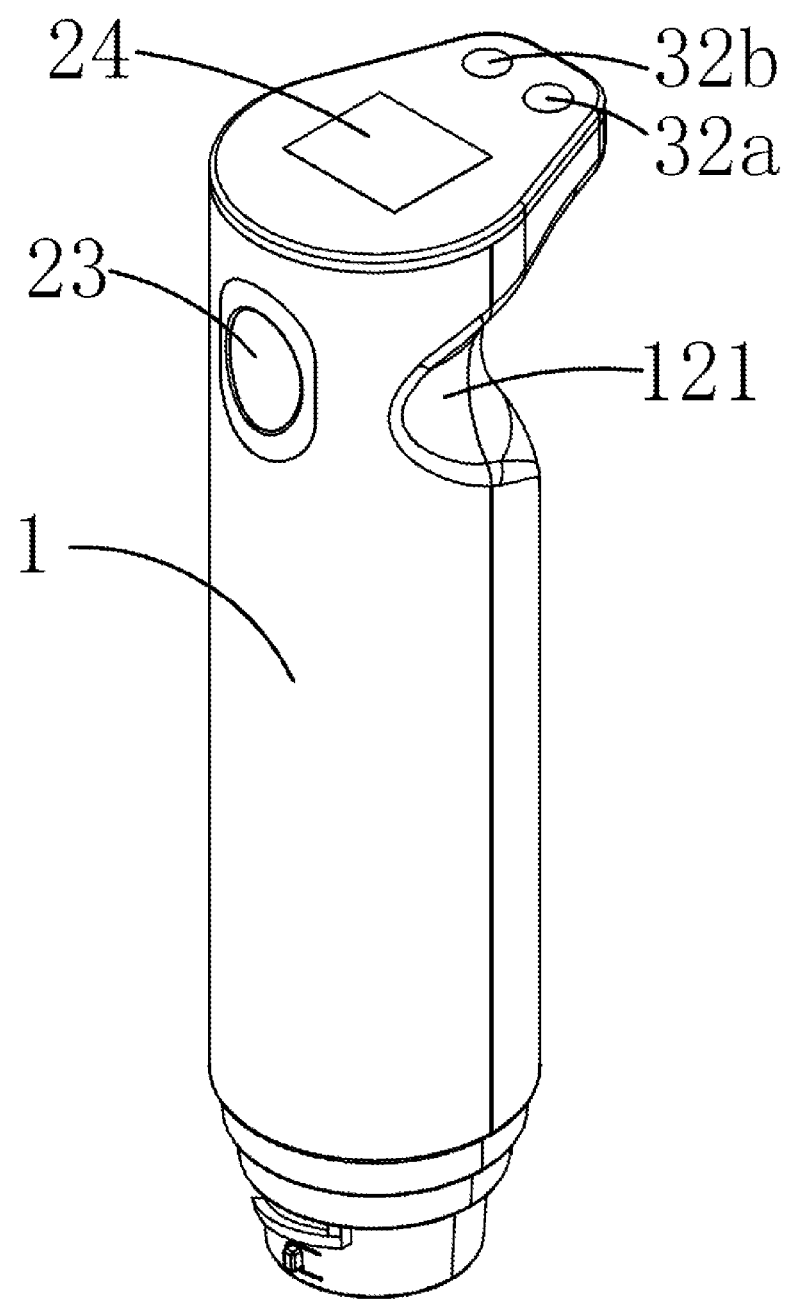
FIG. 1 is a perspective view of the hand-held blender of an embodiment.
Figure 2:
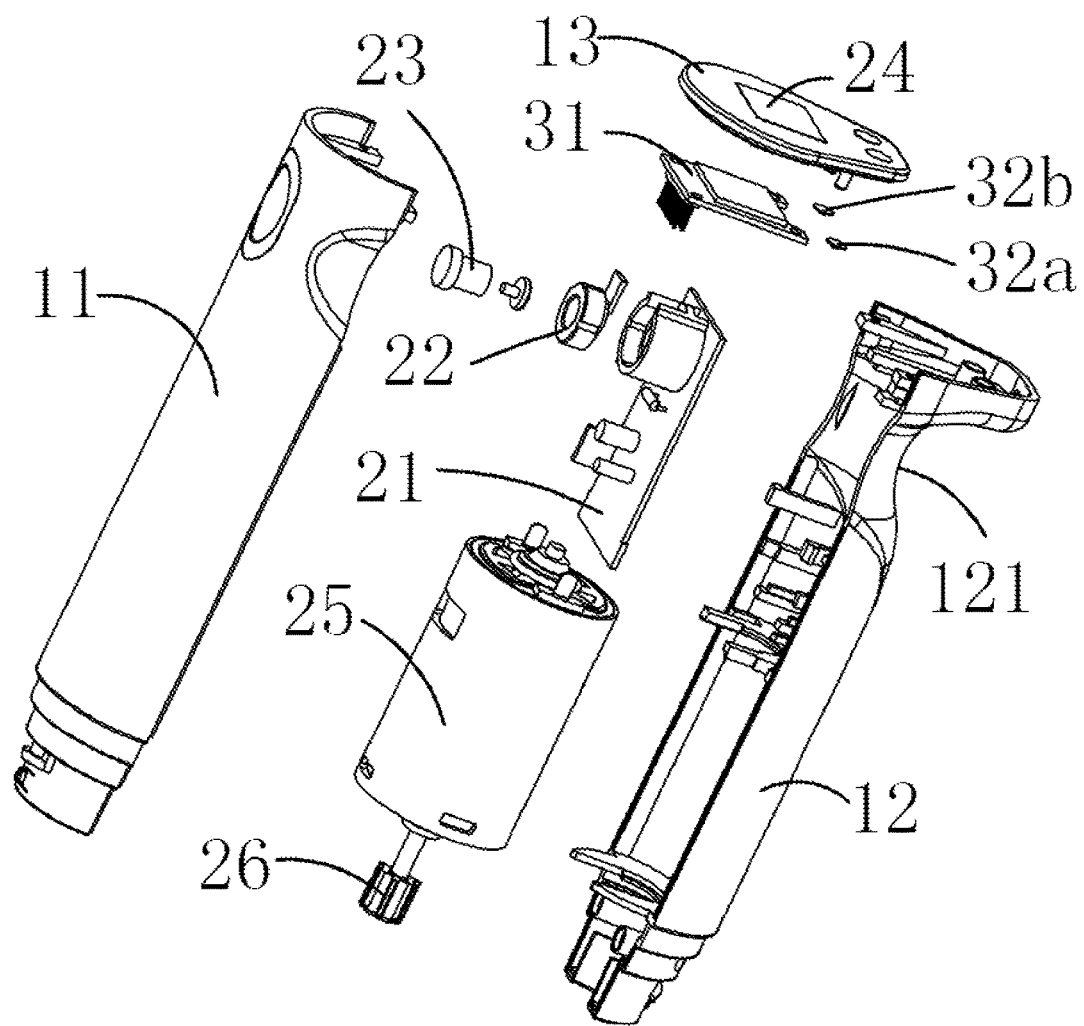
FIG. 2 is an exploded view of the hand-held blender of an embodiment.
Figure 3:
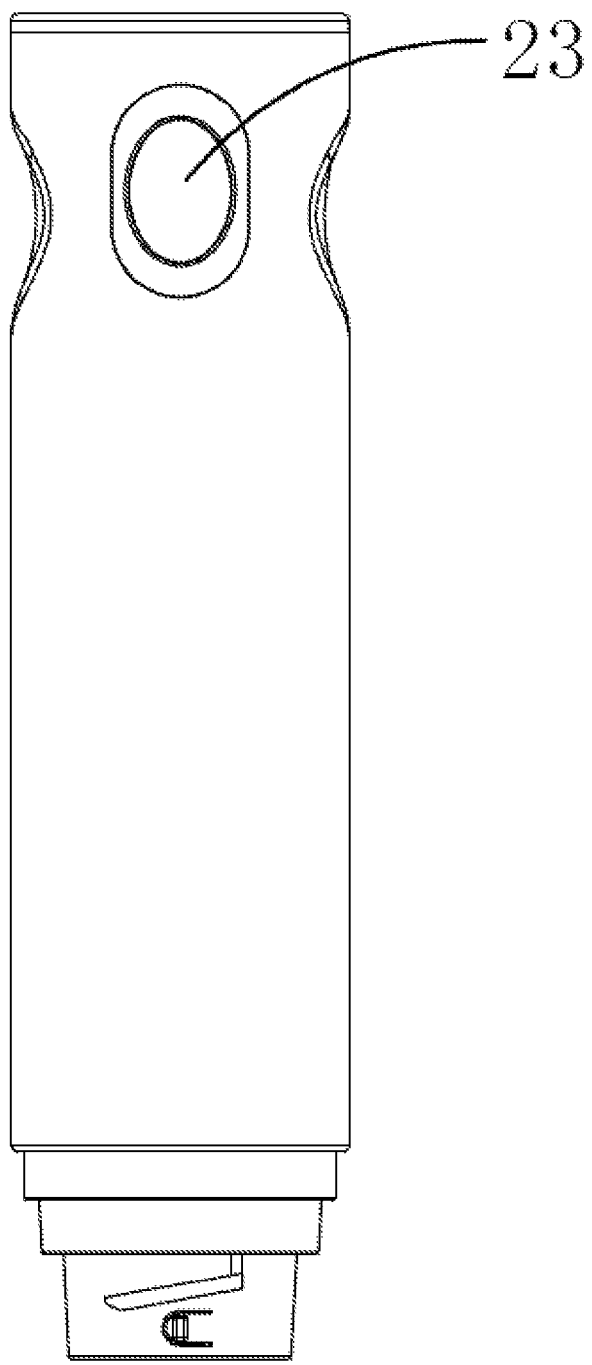
FIG. 3 is a front view of the hand-held blender of an embodiment.
Figure 4:
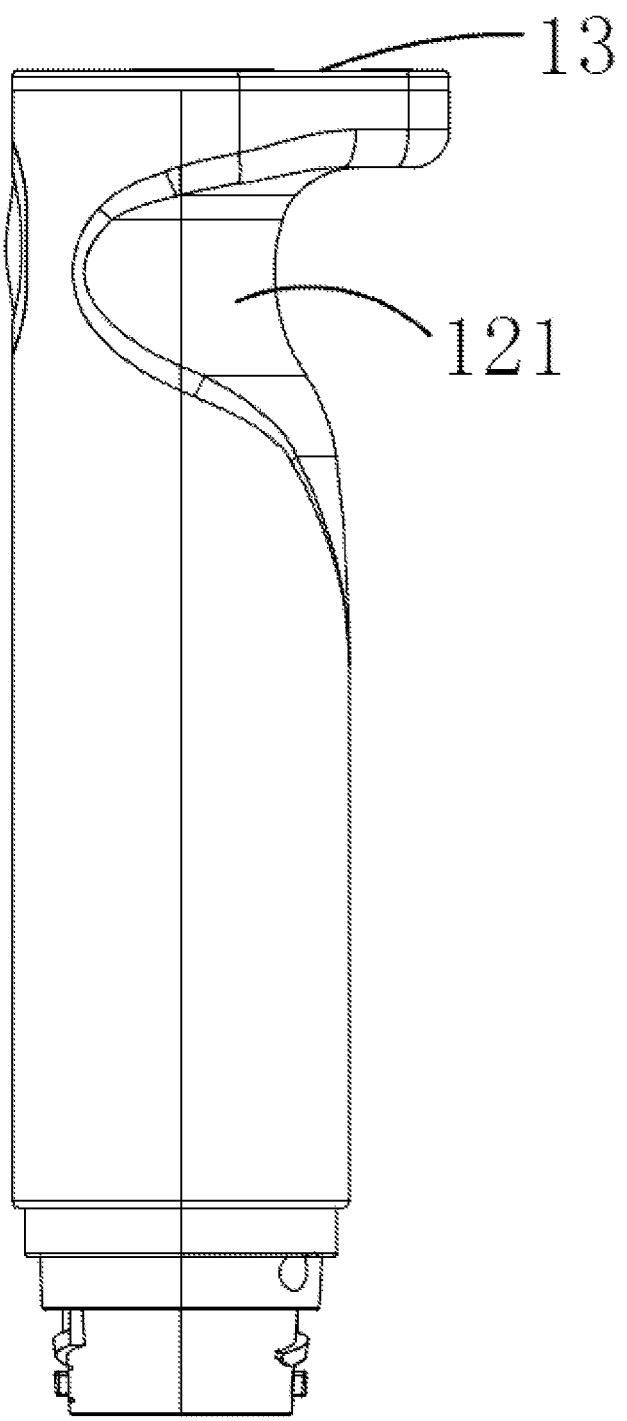
FIG. 4 is a side view of the hand-held blender of an embodiment.
Figure 5:
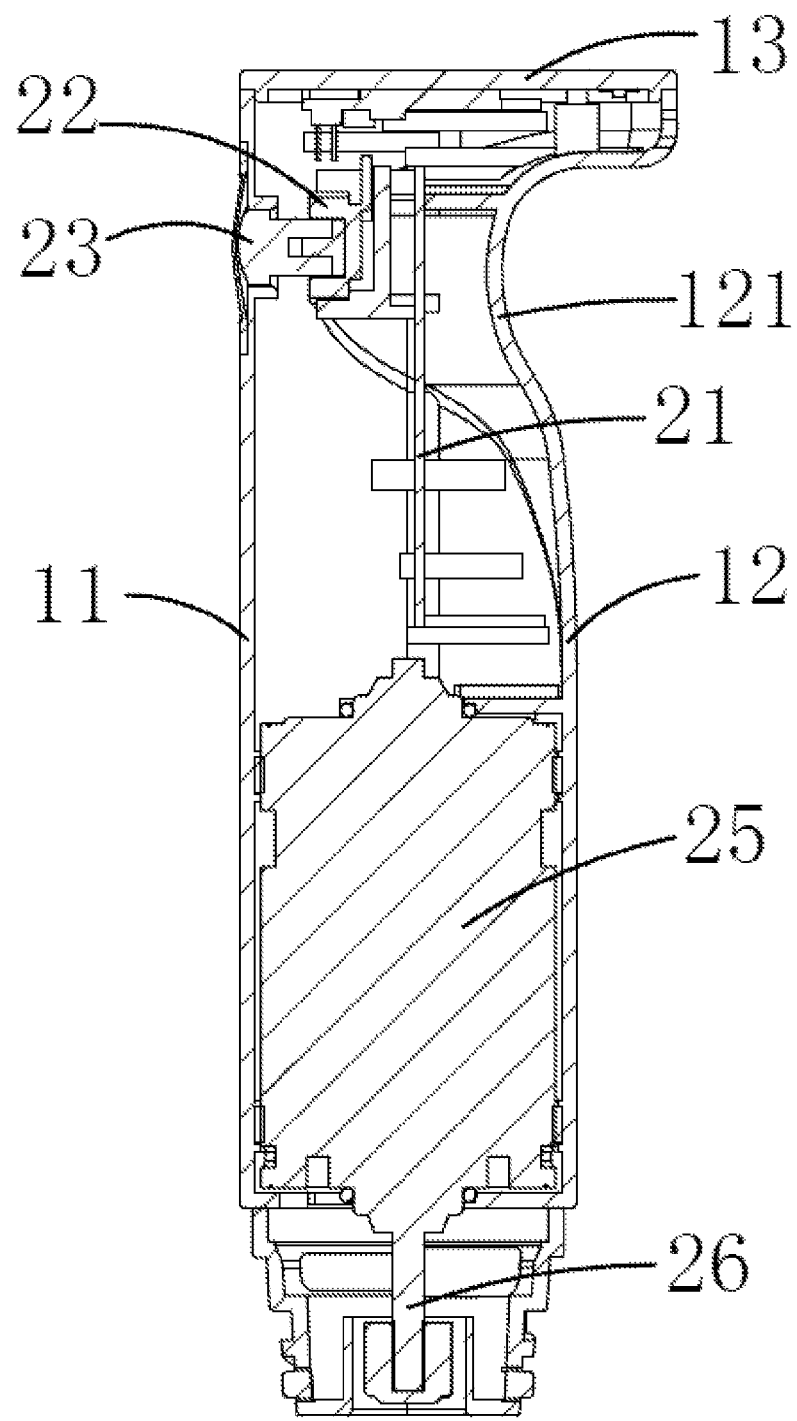
FIG. 5 is a cross-sectional view of the hand-held blender of an embodiment.

The present invention is further described in detail in connection with the attached drawings and the specific embodiments.

As shown in FIGS. 1-5, in a preferred embodiment, the hand-held blender of the present invention comprises a housing 1 and a body. The body is disposed in the housing 1. The hand-held blender may achieve the stepless speed regulation and is very safe.

The housing 1 includes a first shell 11, a second shell 12 and a top shell 13. The first shell 11 roughly appears hollow semi-cylindrical. The second shell 12 also roughly appears hollow semi-cylindrical. There is sealed connection between the first shell 11 and the top shell 13, and between the second shell 12 and the top shell 13, which forms an accommodating chamber receiving the body. Preferably, the housing is sealed and waterproof.

The body includes a microprocessor 21, a pressure sensor 22, a pressure button 23, a pressure monitor 24, a driving device 25, a coupling 26, a stirring rod and a power switch. The stirring rod and the power switch are not shown in the drawings. The pressure sensor 22 is embedded in the outer periphery of the pressure button 23 and used to get the pressure applied on the pressure button 23. And the driving device 25 may be a motor. The microprocessor 21 includes a single chip microcomputer and a thyristor component.

Preferably, the pressure sensor 22 employs a ceramic pressure sensor or similar kind of transducer of small size, high reliability, low power consumption, strong ability to resist shock vibration, and fast response.

Figure 6:
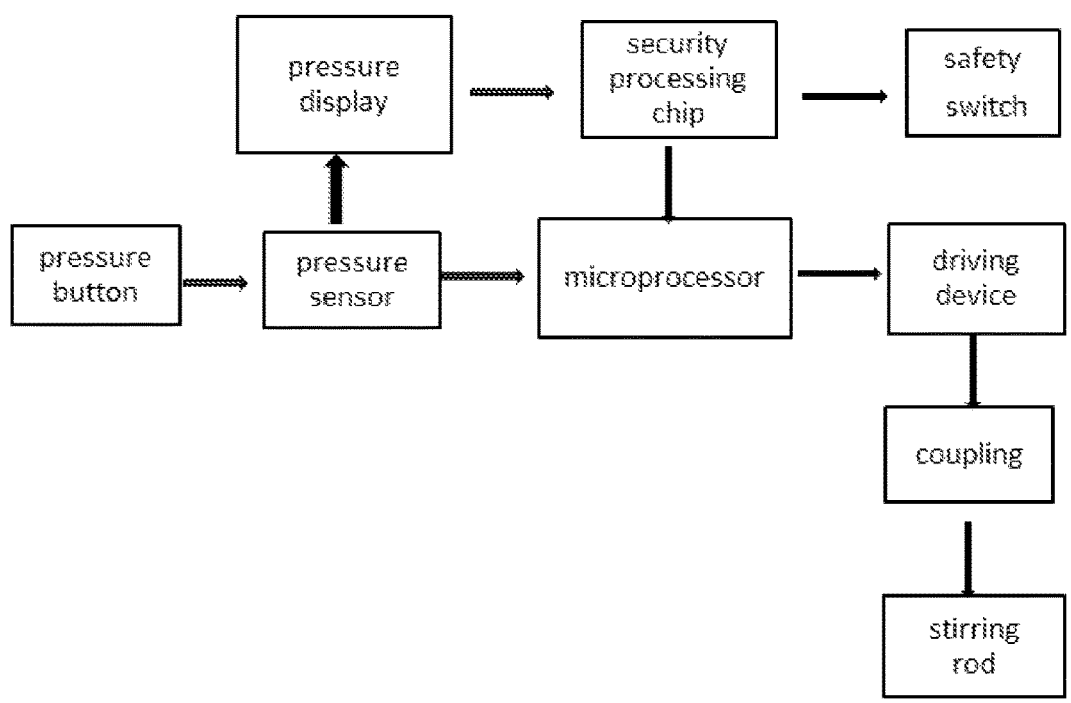
FIG. 6 is a circuit schematics of the hand-held blender of an embodiment.

FIG. 6 is a circuit schematics of the whole circuit of the hand-held blender. The microprocessor 21 is connected with the pressure sensor 22 and the driving device 25, respectively; the pressure sensors 22 is connected with the pressure button 23 and the pressure display 24, respectively; the coupling 26 is connected with the stirring rod and the driving device 25, respectively. Specific working process of stepless speed regulation of the hand-held blender is: the pressure sensor 22 detects the pressure applied on the pressure button 23, on the one hand, the pressure is transmitted to the pressure display 24 for display, on the other hand, the pressure is transmitted to the microprocessor 21; the microprocessor 21 converts the pressure signal into electrical signal and transmits it to the driving device 25, namely, the microprocessor 21 controls the voltage supplied to the driving device 25 in accordance with the pressure, preferably, the voltage is proportional to the pressure; the driving device 25 outputs the driving force to the coupling 26 according to the electrical signal obtained; the coupling 26 transmits the driving force output by the driving device 25 to the stirring rod, and drives the stirring rod to mix. Therefore, the users can control the voltage supplied to the driving device 25 by controlling the pressure applied on the pressure button 23, and thus control the driving force which is provided to the stirring rod by the driving device 25, that is, controlling the stirring speed of the stirring rod. As a consequence, users can adjust the stirring speed of the hand-held blender by the pressure button 23. The hand-held blender of the present invention is simple and easy to operate.

The body also includes a safety protection device. The safety protection device is used to protect the whole circuit of the hand-held blender. The safety protection device includes a safety switch and a security processing chip 31. Among them, the security processing chip 31 is a data processing chip. The security processing chip 31 is respectively connected with the safety switch and the microprocessor 21. According to different operations on the safety switch, the security processing chip converts different operations on the safety switch by users into a locking signal or a unlocking signal, and transfers the locking or unlocking signal to the microprocessor 21. Users can operate to lock or unlock the whole circuit of the hand-held blender via simply operating the safety switch, and the procedure is simple, easy to operate, and very safe.

By setting a safety protection device in the hand-held blender, when the power switch of the hand-held blender is turned on, the hand-held blender is also in the locked state. If the microprocessor 21 gets a unlocking signal from the security processing chip 31, the hand-held blender's circuit is unlocked, and the whole circuit is switched on, at this point, the user can the press pressure button 23 to make the hand-held blender enter into the stirring state; if the microprocessor 21 gets a locking signal from the security processing chip 31, the hand-held blender's circuit is locked, and the whole circuit of the hand-held blender is switched off, at this point, the hand-held blender cannot work. Therefore, even if a user accidentally turns on the power switch of the hand-held blender, the circuit of the hand-held mixer still could not get through, and the hand-held blender cannot enter in the mixing state. Therefore, the hand-held blender of the invention of can avoid the security risks caused by the users' misoperation which starts the hand-held blender, and thus the hand-held blender of the present invention is a very safe one.

The safety switch is set on the top shell 13. Since the size of the hand-held blender is relatively small, users are able to quickly and easily operate the safety switch, which ensures the safety of the hand-held blender, either in the startup phase or in the stirring phase of the hand-held blender.

The number of the safety switches 32a and 32b is at least two, and configured that: after the power switch of the hand-held blender is started, the whole circuit is in the locked state; when all safety switches 32a and 32b are successively pressed, the security processing chip 31 sends a unlocking signal to the microprocessor 21, switching the whole circuit of the hand-held blender on; press the pressure button 23 to make the stirring rod begin to work, that is, the hand-held blender enters into the mixing state; after the hand-held blender is unlocked, when safety switches 32a and 32b are successively pressed again, the security processing chip 31 sends a locking signal to the microprocessor 21, switching off the whole circuit of the hand-held blender, and the hand-held blender stops stirring. By using safety switches 32a and 32b, the whole circuit of the hand-held blender can be locked or unlocked only after safety switches 32a and 32b are successively pressed, further preventing users from making the hand-held blender enter into the mixing state due to misoperation, and thus avoiding the security risks to users due to misoperations, and ensuring the safety of the hand-held blender further.

Understandably, the safety switches 32a and 32b can be replaced by a single safety switch. Pressing the safety switch or pressing the safety switch a second time can unlock or lock the whole circuit of the hand-held blender.

Further, when a hand-held blender stops stirring more than a preset time, for example 10 seconds, the security processing chip 31 sends a locking signal to the microprocessor 21, and locks the whole circuit of the hand-held blender. On the one hand, energy consumption is saved, achieving the purpose of environmental protection, on the other hand, users are prevented from making the hand-held blender enter into the mixing state accidentally and security risks caused thereby, therefore, the hand-held blender of the present invention is environmental friendly and very safe.

Preferably, the safety switches 32a and 32b are touch switches. As a result, users only need to tap the safety switch to operate, and it's very convenient and quick to operate.

The pressure button 23 is set on the upper portion of the outer wall of the first shell 11. A recess 121 is provided at a position on the second shell 12, which corresponds to location of the pressure button 23 roughly, and the recess 121 protrudes towards the pressure button 23. When a user uses the hand-held blender, the thumb just presses the pressure button 23, and the other fingers are located in the arcuate recess. The radian design of the recess provides an ergonomic design. Accordingly, users can operate the hand-held blender conveniently and comfortably.

The pressure display 24 is set on the top shell 13, facilitating users to view the pressure applied on the pressure button 23, and helping users adjust the pressure applied on the pressure button 23. Preferably, the pressure display is an OLED display with clear and sharp appearance and functions.

The hand-held blender of the present invention is small in size, the pressure button is set on the upper portion of the outer wall of the housing, safety switches are set on top of the housing, so users can start, unlock, and lock the hand-held blender with single hand.

In other embodiments, one or more signal lights are set on the pressure display. A plurality of pressure signal lights are provided and used to display the pressure applied on the pressure button, pressure is divided into a plurality of pressure settings from low to high in advance, and the plurality of pressure settings correspond to the pressure signal lights from less to more. Understandably, multiple speed signal lights may be provided to display the running speed of the driving device. It is simple and convenient to provide users with signals such as pressure and running speed by using signal lights.

In conclusion, the hand-held blender of the present invention has advantages of high safety performance, strong reliability, and quick and convenient speed regulation.

Although descriptions of the present invention are provided in connection with specific embodiments, however, it is evident that those skilled in the art may make many alternatives, modifications and variations according to the above content. Therefore, all such alternatives, modifications and variations are included within the spirit and scope of the claims appended.

What is claimed:

1. A hand-held blender, including a housing and a body, the body is disposed in the housing; the body includes a microprocessor, a driving device, a coupling, a stirring rod, and a power switch operable by a user; the coupling is connected with the stirring rod and the driving device, respectively, and used to transmit a driving force output by the driving device to the stirring rod; the microprocessor is connected with the driving device; characterized in that the hand-held blender further includes a safety protection device, a pressure sensor, and a pressure button; the safety protection device includes a safety switch and a security processing chip; the security processing chip is connected with the safety switch and the microprocessor, respectively; the microprocessor programmed to lock or unlock a circuit of the hand-held blender after receiving a locking or unlocking signal from the security processing chip; the pressure sensor is connected with the pressure button and the microprocessor, respectively; the microprocessor further programmed to control a voltage provided to the driving device in accordance with a pressure applied on the pressure button, the voltage proportional to the pressure; wherein when the power switch is first turned on by the user, and then only after unlocking the circuit by the microprocessor, the hand-held blender enters into a mixing mode.

2. The hand-held blender of claim 1, wherein the body further includes a pressure display which is connected with the pressure sensor, and used to display the pressure detected by the pressure sensor.

3. The hand-held blender of claim 2, wherein one or more signal lights are provided on the pressure display.

4. The hand-held blender of claim 1, wherein the number of safety switches is at least two; as the circuit of the hand-held blender is locked, the security processing chip is able to send an unlocking signal to the microprocessor after all the safety switches are pressed successively.

5. The hand-held blender of claim 1, wherein the number of safety switches is at least two; after the circuit of the hand-held blender is unlocked, and when all the safety switches are pressed successively, the security processing chip sends a locking signal to the microprocessor.

6. The hand-held blender of claim 1, wherein when the hand-held blender stops stirring more than a preset time, the security processing chip sends a locking signal to the microprocessor, the circuit is locked, and the hand-held blender does not work.

7. The hand-held blender of claim 1, wherein the safety switch is provided on top of the housing.

8. The hand-held blender of claim 1, wherein the safety switch is a touch switch.

9. The hand-held blender of claim 1, wherein the security processing chip is a data processing chip.

* * * * *